(12) United States Patent
Wolfe (10) Patent No.: US 9,139,130 B2
(45) Date of Patent: Sep. 22, 2015

(54) LIGHT COMPONENT COORDINATION

(71) Applicant: Douglas J. Wolfe, Westerville, OH (US)

(72) Inventor: Douglas J. Wolfe, Westerville, OH (US)

( * ) Notice: Subject to any disclaimer, the term of this patent is extended or adjusted under 35 U.S.C. 154(b) by 0 days.

(21) Appl. No.: 14/294,703

(22) Filed: Jun. 3, 2014

(65) Prior Publication Data

US 2014/0361686 A1    Dec. 11, 2014

Related U.S. Application Data

(60) Provisional application No. 61/831,806, filed on Jun. 6, 2013.

(51) Int. Cl.
*B60Q 1/14* (2006.01)
*B60Q 1/26* (2006.01)
*G08G 1/16* (2006.01)

(52) U.S. Cl.
CPC .......... *B60Q 1/2611* (2013.01); *B60Q 2900/30* (2013.01); *G08G 1/161* (2013.01); *G08G 1/168* (2013.01)

(58) Field of Classification Search
None
See application file for complete search history.

(56) References Cited

U.S. PATENT DOCUMENTS

| | | | |
|---|---|---|---|
| 5,892,439 A * | 4/1999 | Molina Torres | 340/471 |
| 2002/0070849 A1 * | 6/2002 | Teicher et al. | 340/425.5 |
| 2011/0175719 A1 * | 7/2011 | Ford | 340/473 |

* cited by examiner

*Primary Examiner* — Douglas W Owens
*Assistant Examiner* — Dedei K Hammond
(74) *Attorney, Agent, or Firm* — Kegler Brown Hill & Ritter; James J. Pingor (57) ABSTRACT

A light coordination system for coordinating the operation of multiple lights systems/devices in multiple public safety vehicles is provided. The system includes a detection component that detects at least one vehicle and/or at least one light device on the at least one vehicle, a mode component in communication with the detection component that changes an operating mode of the system based on information from the detection component, an analysis component in communication with the mode component and the detection component that generates a light coordination scheme based on information from the detection component and the mode component, and an implementation component that implements the light coordination scheme.

12 Claims, 8 Drawing Sheets

LIGHT COMPONENT COORDINATION

CROSS-REFERENCE TO RELATED APPLICATIONS

This application claims the benefit of U.S. Provisional Patent application Ser. No. 61/831,806 entitled "LIGHT COMPONENT COORDINATION" filed on Jun. 6, 2013. The entirety of the above-noted application is herein incorporated by reference.

ORIGIN

The innovation disclosed herein relates to lighting systems and more specifically to operating one or more lighting systems in one or more vehicles, such as public safety vehicles.

BACKGROUND

Generally, public safety vehicles can be outfitted with emergency vehicle lighting, a lighting system, etc. Emergency vehicle lighting can include visual warning lights fitted internally or externally to a vehicle and used to convey a sense of urgency or a warning to other drivers or vehicles on the road. A variety of types of optical options, light components, or light systems are available, such as steady burning lamps, rotating lights, strobe lights, light emitting diode (LED) lighting, etc. Additionally, light components or light systems can be configured in a variety of ways. For example, a light system can be roof mounted, a light bar, body mounted, integrated into a vehicle, interior mounted, etc.

In the event that more than one public safety vehicle is required at an emergency scene, the multiple lights from the first public safety vehicle at the scene can visually impair additional emergency personal as they arrive at the scene or even other motorists passing by the scene.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In accordance with one aspect of the innovation, a system for operating light systems is provided and includes a plurality of communication devices that detects and communicates with at least one light device, and a manual control device that controls the operation of the at least one light device based on the communication of the plurality of communication devices with the at least one light device.

In accordance with another aspect of the innovation, a light coordination system for operating light devices is provided and includes a detection component that detects at least one vehicle and/or at least one light device on the at least one vehicle, a mode component in communication with the detection component that changes an operating mode of the system based on information from the detection component, an analysis component in communication with the mode component and the detection component that generates a light coordination scheme based on information from the detection component and the mode component, and an implementation component that implements the light coordination scheme.

In one or more embodiments, a first vehicle is engaged in a traffic stop can be placed in a coordination mode. This means that the first vehicle is setup to deactivate rear lights of a lighting system of the first vehicle when a second vehicle arrives. In some embodiments, the first vehicle can be configured to sense or detect the second vehicle and deactivate the rear lights accordingly. In other embodiments, the second vehicle can issue a command to the first vehicle, which may deactivate the rear lights upon receipt of the command. In one or more embodiments, officers can carry a fob component configured to deactivate the rear lights based on a press of a button, for example. It will be appreciated that other embodiments can be implemented to capture the spirit of this disclosure (e.g., mitigating vision impediments to officers from lighting systems).

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DESCRIPTION

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Figure 10:
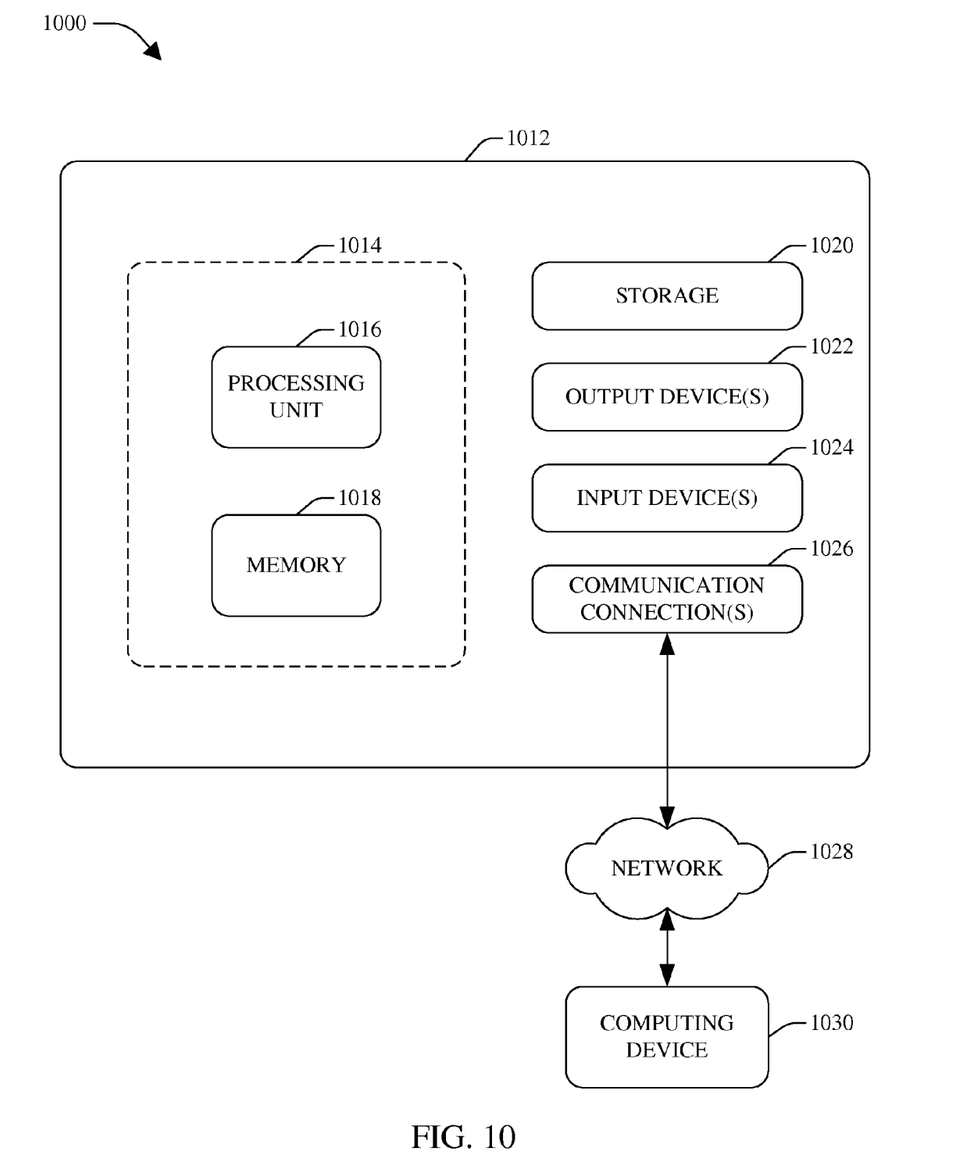
FIG. 10 is an illustration of an example computing environment where one or more of the provisions set forth herein are implemented, according to one or more embodiments.

For one or more of the figures herein, one or more boundaries, such as boundary 1014 of FIG. 10, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The innovation disclosed herein relates to a system and method of coordinating the operation of one or more lighting systems/devices in one or more vehicles (e.g., public safety vehicles) in accordance with an aspect of the innovation. Vehicle lighting systems may include vehicle light devices such as, but not limited to, front headlights, rear taillights, parking lights, internal light system, light bars, emergency lighting systems in public safety vehicles (e.g., police, fire, ambulance, etc.), etc. As will be described in more detail below, the system and method facilitates the coordination of operation of one or more light devices in one or more vehicles either automatically via a coordination system, manually, remotely, via sensors, via a key fob, etc. It is to be understood that the vehicles referenced herein may be emergency and/or non-emergency vehicles. For purposes of illustration only, from time to time an emergency vehicle and emergency personal (e.g., police officer) will be referenced to describe the innovative system and method but is in no way limiting to the scope of the disclosure.

When a public safety official (e.g., police officer) stops a suspect, the public safety official may request additional personal to assist. During the stop, the public safety official enables one or more light devices in the vehicle lighting system, such as, a light bar located in the front, rear, or on top of the vehicle, thereby notifying drivers of other vehicles that an emergency vehicle is present. Thus, front lights and/or rear lights located in the vehicle can alert oncoming or passing traffic of the presence of a public safety official(s). Emergency lights in emergency vehicles are bright so as to alert passing traffic the presence of the emergency vehicle.

In addition, emergency vehicle lighting devices may be bright to assist the public safety official in nighttime situations so that emergency personal has a clear view of a suspect, a suspect's vehicle, and/or an associated situation. Conversely, the suspect or any other individual facing the vehicle generally has an impaired view due to the brightness of the emergency vehicle lighting. In addition, the brightness of the emergency vehicle lighting also creates a visual distraction or impairment for any additional public safety officials approaching the scene in another vehicle and for passing motorists. As a result of this, any additional public safety officials approaching the scene may not have a clear view of the first public safety official and the suspect or an associated situation, which can create a potentially dangerous situation.

Similarly, in the event of an accident scene, there are typically many emergency vehicles present at the scene, all or some of which may have their light systems activated. This situation, as in the example above, also creates a visual distraction or impairment for any additional public safety officials approaching the scene in another vehicle and for passing motorists.

Figure 1:
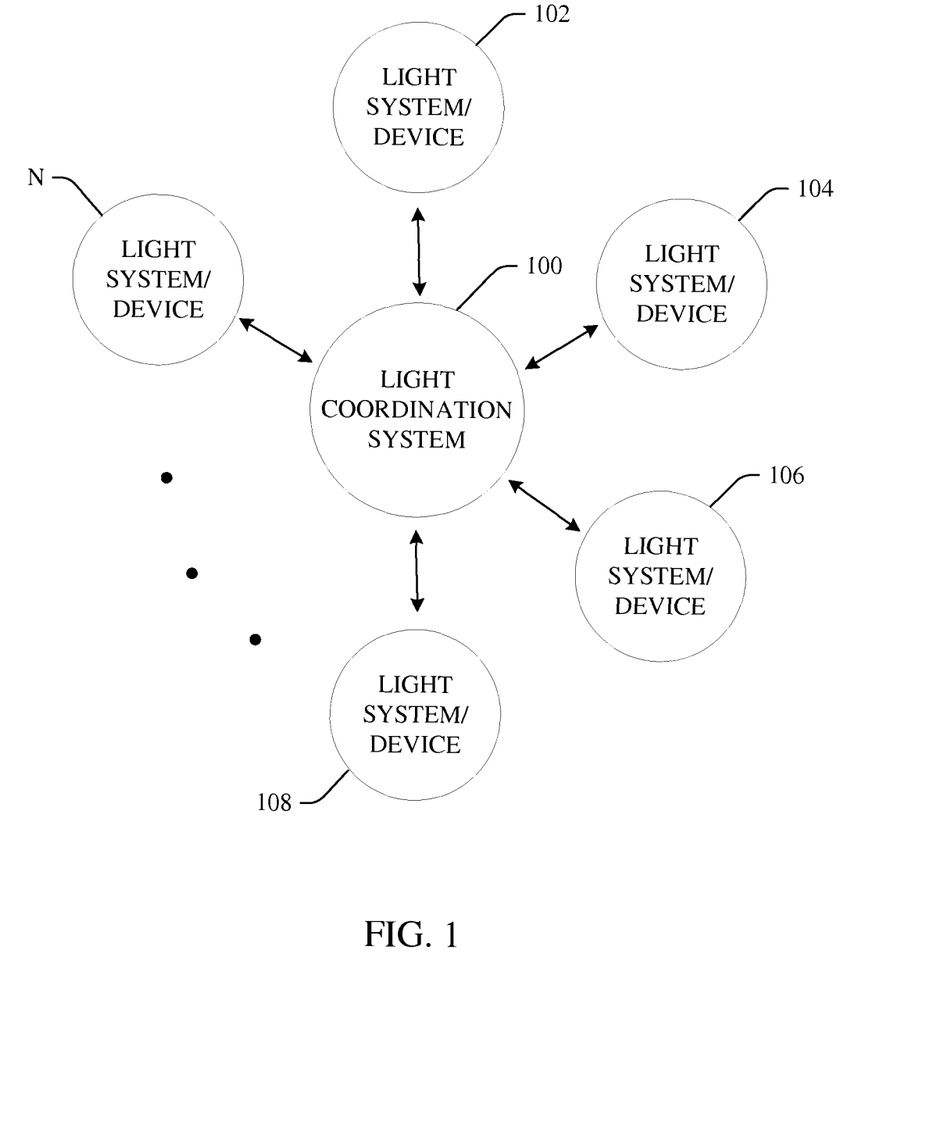
FIG. 1 is a diagram of an innovative light coordination system in communication with multiple light systems in accordance with an aspect of the innovation.

Referring now to FIG. 1, the innovation disclosed herein is a light coordination system 100 that provides a solution to the potentially dangerous situations described above. The light coordination system 100 provides a system and method to coordinate the operation (e.g., activate, deactivate, dim, make brighter, change beam angle, change flashing frequency, etc.) of one or more lighting systems/devices 102, 104, 106, 108 . . . N (hereinafter collectively referenced as "N") in multiple vehicles to thereby reduce the visual impairment of any person or persons approaching the scene and for passing motorists. Any vehicle at a scene that has its light systems/devices N altered by a light coordination system 100 is operating in a modified lighting operation. As illustrated in FIG. 1, the light coordination system 100 can communicate with one or more light systems/devices N in one or more vehicles as necessary.

Similarly, as will be discussed in greater detail herein, different or multiple light coordination systems may communicate with or manage light systems/devices N. In other words, after a first public safety official arrives at a scene, a second public safety official may utilize a light coordination system to manage a first light system/device 102. When a third public safety official arrives, he or she may utilize a different light coordination system to manage the light system/devices 102 and 104 of the first and second public safety officials. In this way, modularity may be provided such that any number of light coordination systems 100 (e.g., 100A, 100B, 100C, etc.) may manage, communicate, or coordinate operation of most any plurality of light systems/devices N.

Regardless, the light coordination system 100 can be disposed in the emergency vehicle or may be part of any light system/device N in the emergency vehicle. In addition, the light coordination system 100 may be operated automatically, manually from within the vehicle, or may be operated remotely via an electronic mobile device, such as but not limited to, a mobile phone, a remote, a key fob, a PDA, a computer, a tablet, etc. For example, a mobile device may have an application installed which enables coordination of most any of the light systems/devices N. In addition, the light coordination system 100 may respond to voice commands.

Figure 2:
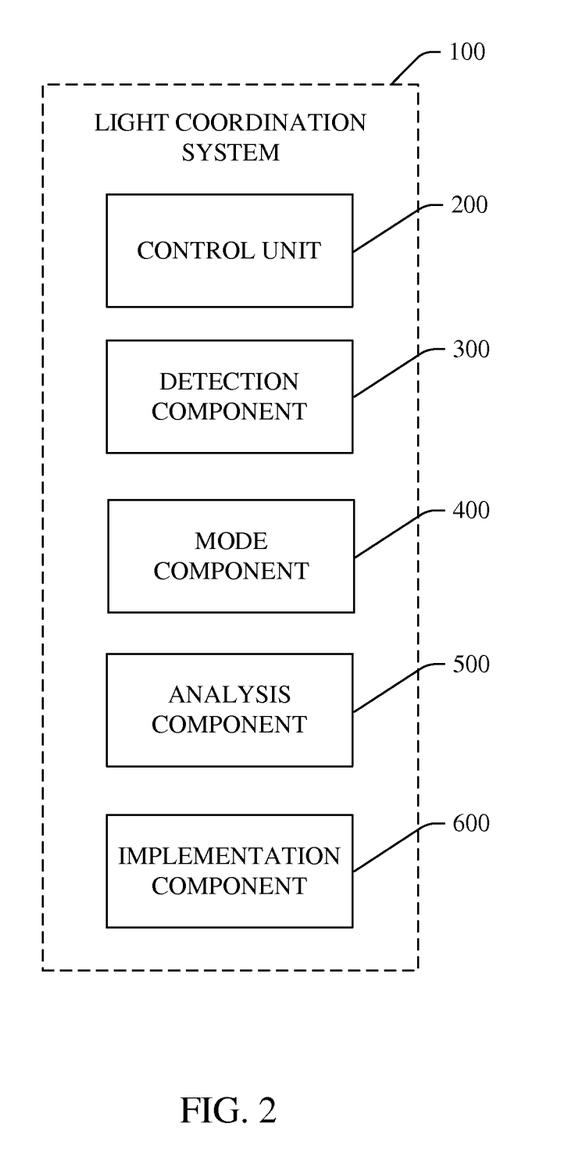
FIG. 2 is an overall block diagram view of the light coordination system in accordance with an aspect of the innovation.

FIG. 2 is an overall block diagram view of the light coordination system 100 in accordance with an aspect of the innovation. The light coordination system 100 includes a control unit 200, a detection component 300, a mode component 400, an analysis component 500, and an implementation component 600. The control unit 200 controls the operation of the light coordination system 100 and respective components.

Figure 3:
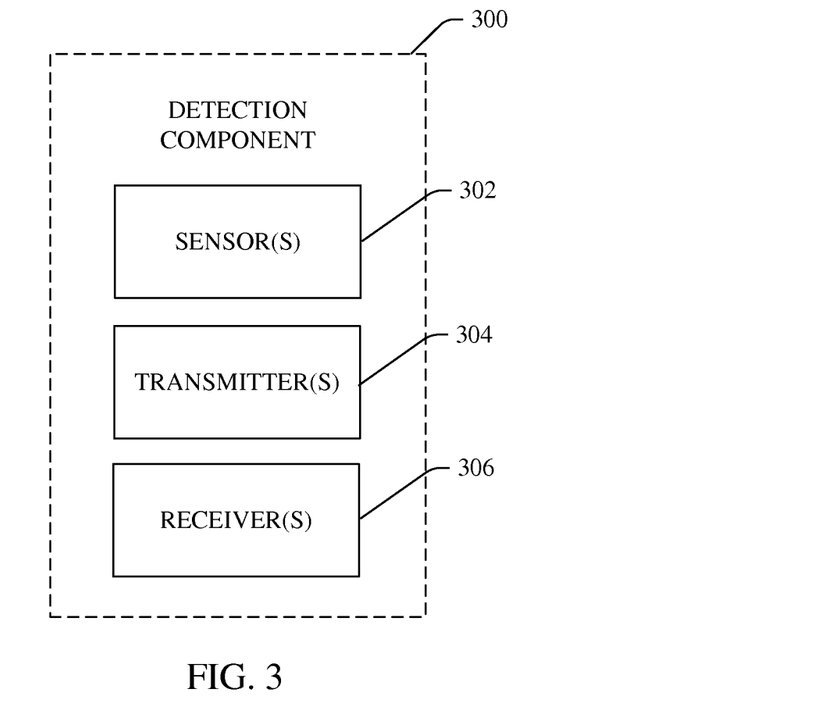
FIG. 3 is a block diagram of a detection component in accordance with an aspect of the innovation.

Referring to FIG. 3, the detection component 300 performs several functions. Specifically, the detection component 300 is configured to determine the presence of additional vehicles (e.g., presence information) and relay that information to the mode component 400. If another vehicle is detected the mode component 400 will change the mode status (explained below) of the light coordination system 100 and relays that information back to the detection component 300. The detection component 300 then determines what, if any, light systems in the additional vehicles are operating, determines the current operating mode of the light coordination systems in the additional vehicles, location of the additional vehicles at the scene with respect to each other, and detect signals from other light coordination systems at the scene. The detection component 300 can also detect the transmission status (e.g., park, reverse, drive, neutral, etc.) of other vehicles.

The detection component 300 may include communication devices, such as but not limited to, one or more sensors 302 (e.g., proximity sensors, motion sensors, etc.), one or more transmitters 304, and one or more receivers 306. The sensors 302 are configured to detect the presence of other vehicles that are in a predetermined range of the light coordination system 100. The sensors 302 may include sensors, such as but not limited, proximity sensors, motion sensors, heat sensors, etc. Additionally, sensors 302 may detect presence information associated with other vehicles based on other detection components affixed to or associated with other vehicles. Detection of any vehicles and/or light coordination systems is communicated to the control unit 200.

The transmitters 302 and receivers 304 are configured to transmit and receive signals to and from other light coordination systems and/or light devices N that may be present at the emergency scene. Thus, multiple light coordination systems can communicate with each other. In the examples cited above, each vehicle at the scene may be equipped with a light coordination system 100. In this scenario, the light coordination systems 100 can communicate with each other to coordinate the operation of the light devices N in each vehicle to create a visually safe environment.

In addition, vehicles can be detected in a variety of ways, such as Bluetooth, RFID, NFC, telematics, timers, idle timers, proximity sensors, seat belt sensors, door sensors, etc. Similarly, transmitting a command or engaging a vehicle in a mode can be based on the aforementioned (Bluetooth, RFID, NFC, telematics, timers, idle timers, proximity sensors, seat belt sensors, door sensors, etc.).

Figure 4:
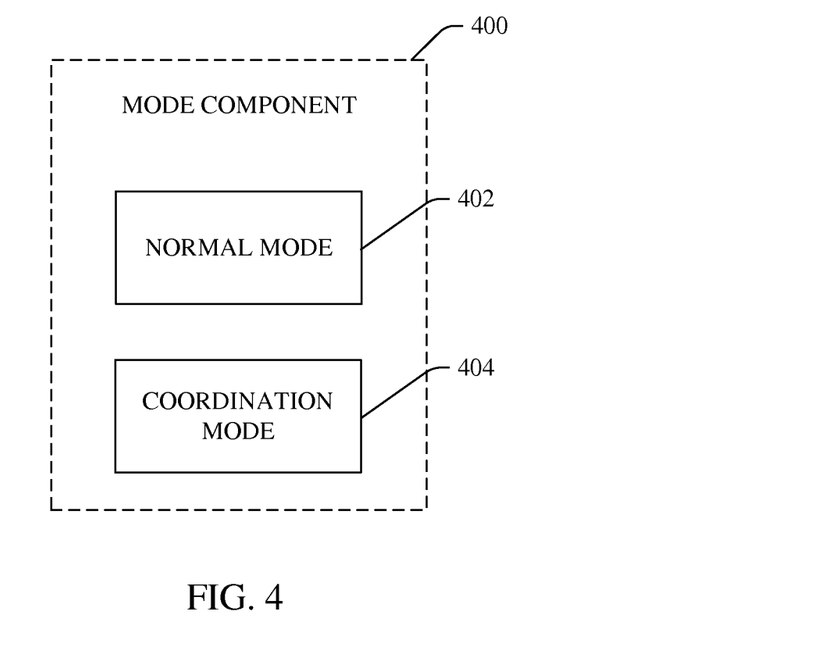
FIG. 4 is a block diagram of a mode component in accordance with an aspect of the innovation.

Referring to FIG. 4, the mode component 400 is configured to activate and manage an operating mode of the light coordination system 100 based on information from the detection component 300. The mode component 400 can automatically change and/or manage the mode of the light coordination system 100 based on information from the detection component 300. The modes may include a normal (non-activated) mode 402 and a coordination (activated) mode 404.

In the normal mode 402, while the light coordination system 100 in a given vehicle is actively sensing other vehicles, it is not actively sensing light devices or other light coordination systems and is not transmitting, receiving, etc. presence information to or from another light coordination system and/or to light devices N adapted to receive signals from the light coordination system 100. In other words, a lighting system equipped on a vehicle is generally not affected or influenced by another vehicle equipped with the light coordination system 100 and/or another lighting system.

In the coordination mode 404, a vehicle equipped with the light coordination system 100 can be sensing, transmitting, receiving, etc. presence information to or from another vehicle. In other words, when the light coordination system 100 is in the coordination mode 404, a lighting system equipped on a vehicle can be affected or influenced by the vehicle equipped with the light coordination system 100 operating in the coordination mode 404. When a vehicle is in coordination mode, this can mean that the lighting system of the vehicle is in coordination mode.

Figure 5:
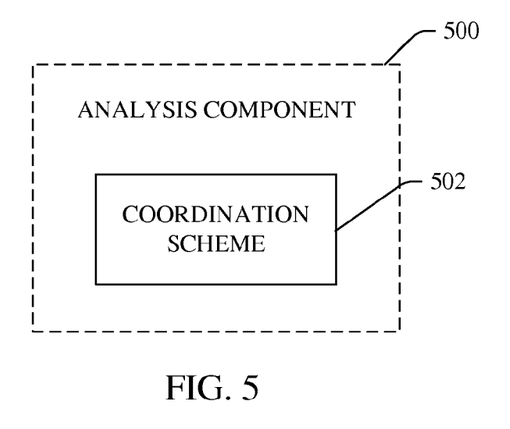
FIG. 5 is a block diagram of an analysis component in accordance with an aspect of the innovation.

Referring to FIG. 5, the analysis component 500 is configured to analyze data from the detection component 300 and the mode component 400. Based on this data, the analysis component 500 generates a light coordination scheme 502 for the various light systems at the scene to provide optimum visibility for all persons at the scene and for passing motorists. More specifically, the light coordination scheme 502 can illustrate the activation/deactivation of any available combination of light devices to produce the optimum visual results for all those at the scene and for passing motorists.

Information used to generate the light coordination scheme 502 may include data, such as but not limited, number of vehicles at the scene, location of vehicles with respect to each other, arrival and/or departure of vehicles to and from the scene (thus, the light coordination scheme is dynamic in that it can constantly update information and change accordingly), operation status of all light devices at the scene, mode status of other light coordination systems at the scene, etc. For example, in a scene where there are two vehicles A, B (one parked in front of the other), the light coordination system 100 may analyze the above mentioned data and determine which lights to keep operational, activate, and/or deactivate.

Figure 6:
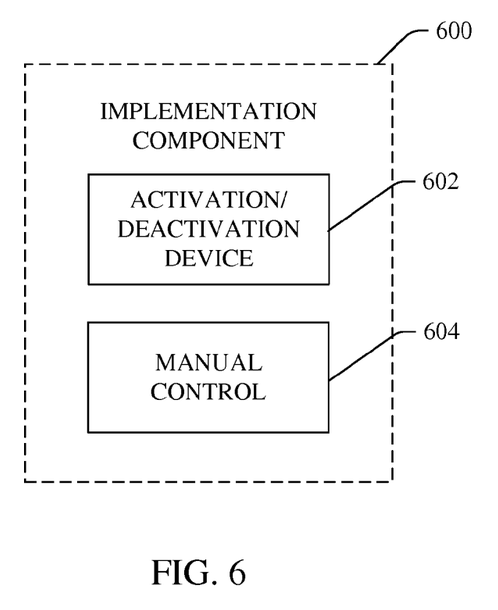
FIG. 6 is a block diagram of an implementation component in accordance with an aspect of the innovation.

Referring to FIG. 6 the implementation component 600 is configured to implement the light coordination scheme 502 provided from the analysis component 500. The implementation component 600 includes an activation/deactivation device 602 that activates and/or deactivates light systems as provided by the light coordination scheme 502 of the analysis component 500. The activation/deactivation device 602 may automatically carry out the light coordination scheme based on information from the detection, mode, and analysis components 300, 400, 500.

On the other hand, the implementation component 600 may include a manual control 604 and be manually controlled with controls inside the vehicle or with an electronic remote device, such as but not limited to a mobile phone, a key fob, a computer, a PDA, a tablet, etc. Thus, upon arrival to the scene, any subsequent public safety official can activate/deactivate any lights as he/she deems necessary with or without input from the mode component 400, the analysis component 500, and the light coordination scheme 502.

Figure 6A:
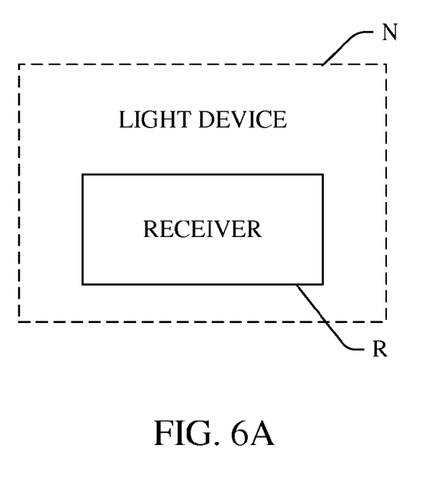
FIG. 6A is a block diagram of light device including receiver in accordance with an aspect of the innovation.

For example, a second public safety official to the scene can quickly deactivate the rear lights on the first vehicle (forward vehicle) to allow the public safety official to see more clearly as he/she approaches the scene. Specifically, as shown in FIG. 6A, the light devices N may include one or more receivers R that receive the transmitted activation/deactivation signal from the public safety official. Thus, upon arrival at the scene, the public safety official can manually transmit a signal to any light device N and either activate it or deactivate it as he/she deems necessary from the controls inside the vehicle or with the electronic remote device.

Figure 7:
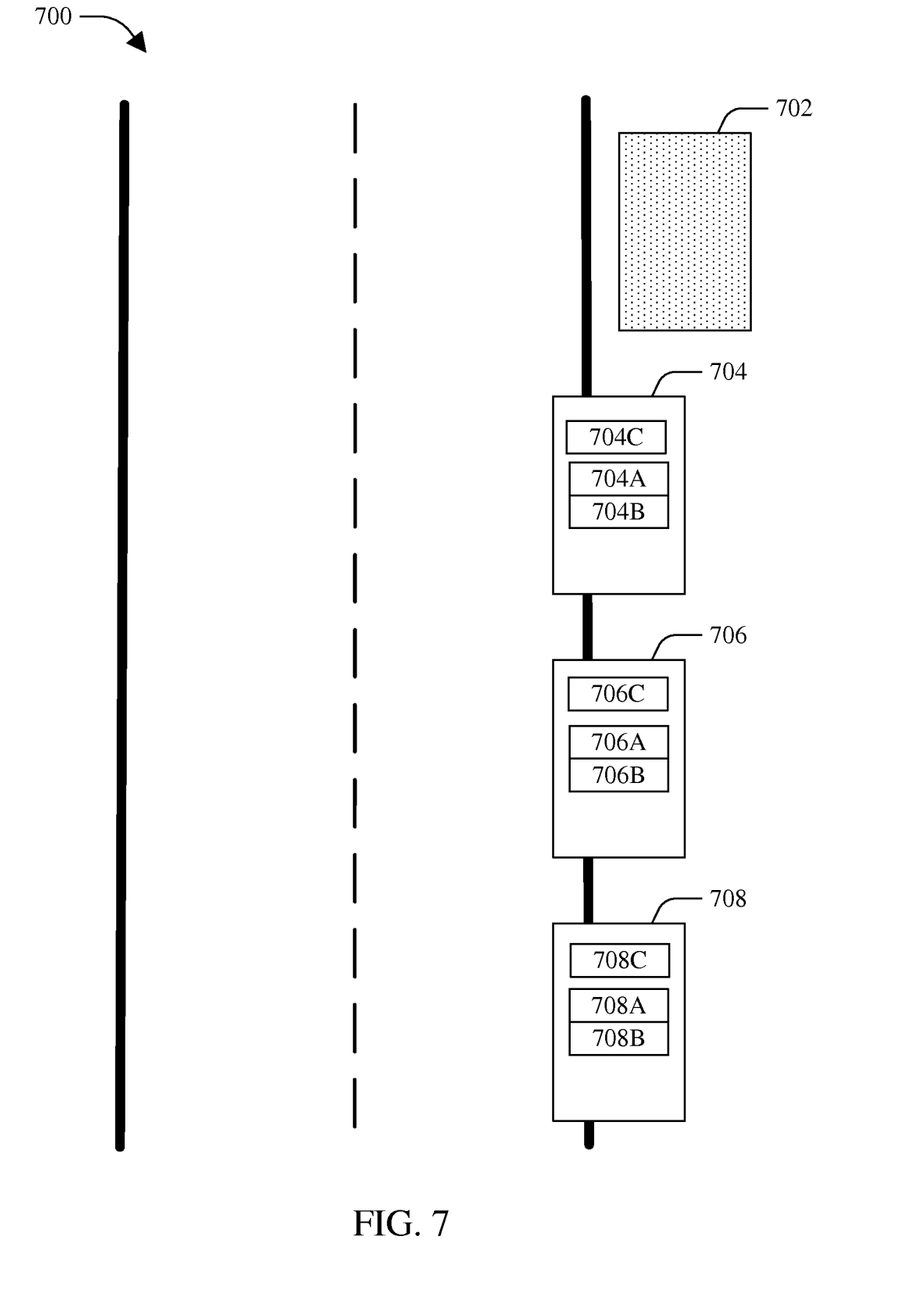
FIG. 7 is an example scenario illustrating the operation of the light coordination system in accordance with an aspect of the innovation.

FIG. 7 is an example scenario 700 illustrating the operation of the light coordination system 100 in accordance with an aspect of the innovation. In this example, a suspect vehicle (or simply "suspect") 702 is pulled over by a first emergency vehicle (e.g., first officer) 704, which in turn summons a second emergency (e.g., second officer) vehicle 706 and a third emergency vehicle (e.g., third officer) 708. In this example embodiment, the first emergency vehicle 704 may include one or more light devices (e.g., a front and a rear light device) 704A, 704B, the second emergency vehicle 706 may include one or more light devices (e.g., a front and a rear light device) 706A, 706B, and the third emergency vehicle 708 may include one or more light devices (e.g., a front and a rear light device) 708A, 708B. In addition, each vehicle may be equipped with a light coordination system 704C, 706C, and 708C as described herein.

Figure 8:
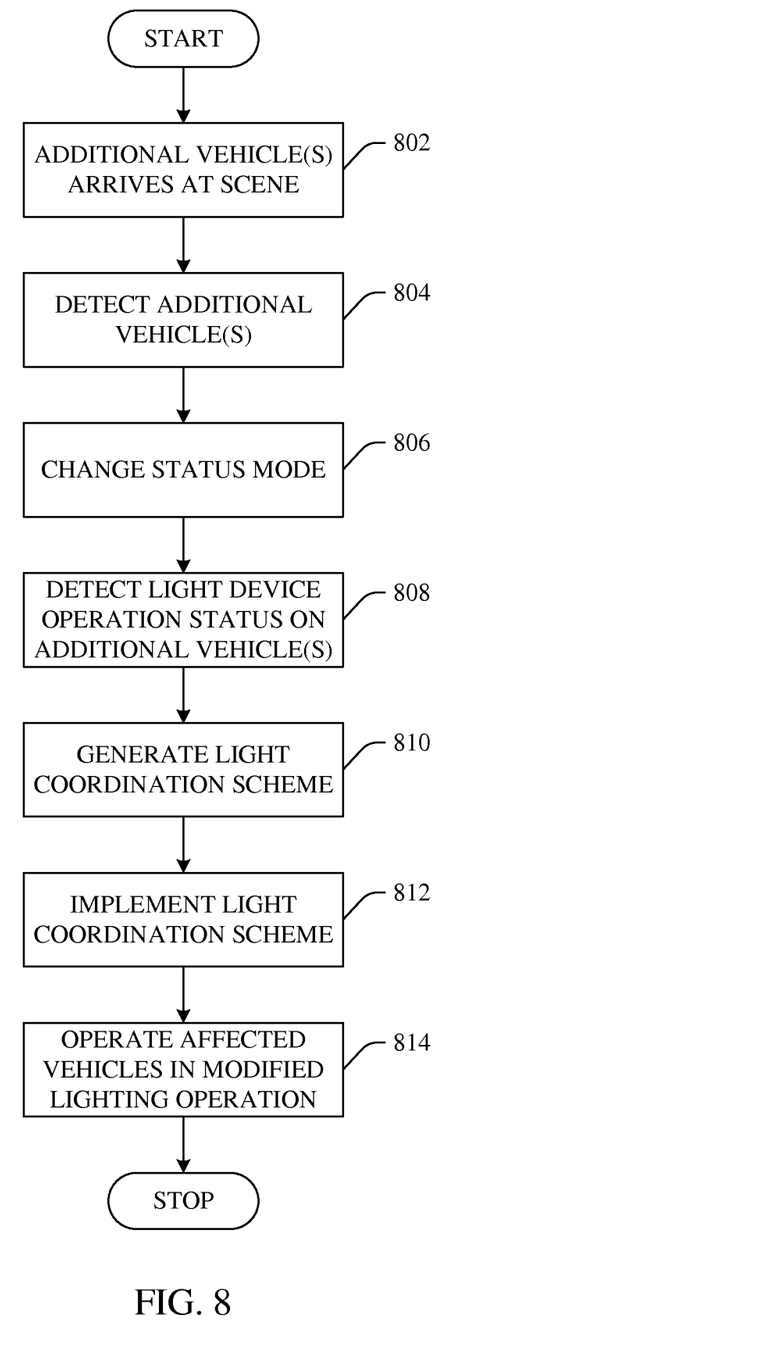
FIG. 8 is a flow chart illustrating a method of operating the light coordination system in accordance with an aspect the innovation.

Referring to FIGS. 7 and 8, FIG. 8 is a flow chart illustrating an example method of operating the light coordination system in the example scenario illustrated in FIG. 7 in accordance with an aspect the innovation. In this example, although the public safety officials, specifically police officers, will be referenced to illustrate the operation of the light coordination system. It is to be understood that the reference to police officers to illustrate the operation of the light coordination is for illustrative purposes only and is not intended to limit the scope of the light coordination system.

In addition, for the example illustrated in FIGS. 7 and 8, the light coordination system of the first vehicle will be the primary system used to coordinate the operation of the light devices of the various vehicles. It is to be understood, however, that the light coordination system from either the second or third vehicle can be the primary system to coordinate the operation of the light devices. Thus, any light coordination system present at the scene can be the primary coordination system.

In another embodiment, the primary light coordination system at a given scene can change based on several factors, such as but not limited to, location of all vehicles, timing of arrival and/or departure of the vehicles, number of vehicles at the scene, etc.

Still referring to FIGS. 7 and 8, at 802, shortly after the first officer 704 has stopped and pulled over the suspect 702, the second officer in the second vehicle 706 arrives at the scene. At 804, the detection component 300 of the light coordination system 704C in the first vehicle 704 detects the presence of the second and third vehicle 706, 708 and light devices N associated with each vehicle 706, 708. At 806, the mode component 400 of the light coordination system 704C changes mode from normal mode to coordination mode described above. At 808, the detection component 300 of the light coordination system 704C detects the operation status of the light devices 706A, 706B on the second vehicle 706 and 708A, 708B on the third vehicle. At 810, the analysis component 500 of the light coordination system 100 analyzes the detected information from the detection component 300 and generates a coordination scheme 502 described above. At 812, the implementation component 600 of the light coordination system 704C implements the coordination scheme 502. At 814, the affected vehicles are switched to operate in the modified lighting operation.

As mentioned above, the light coordination scheme can illustrate the activation/deactivation scheme of any available combination of light devices to produce the optimum visual results for all those at the scene and for passing motorists. For example, in the scene illustrated in FIGS. 7 and 8 and described above, the light coordination scheme may illustrate the activation of light device 704A on the first vehicle 704 and 708B on the third vehicle 708 and the deactivation of the remaining light devices 704B, 706A, 706B, and 708A. It is to be understood, however, that the light coordination scheme can illustrate the activation/deactivation of any combination of light devices 704A, 704B, 706A, 706B, 708A, and 708B.

In another embodiment, the light coordination system 704C, 706C of either the first or second vehicle 704, 706 can automatically modify the light devices based on a detection of the transmission status. For example, if the second light coordination device 706C detects that the first vehicle 704 is in "PARK", the second light coordination device 706C can automatically alter the light devices 704A, 704B, 706A, 706B of both vehicles 704, 706 (e.g., deactivate 704B and activate 706B). Similarly, the third light coordination system 708C can perform the same function upon arrival of the third vehicle 708 to the scene.

In another embodiment, the first light coordination system 704C can automatically alter the light devices 704A, 704B, 706A, 706B (e.g., deactivate 704B and activate 706B) of both vehicles 704, 706 upon arrival and detection of the second vehicle 706. Similarly, the second light coordination system 706C can perform the same function upon arrival of the third vehicle 708 to the scene (e.g., deactivate 706B and activate 708B).

Figure 9:
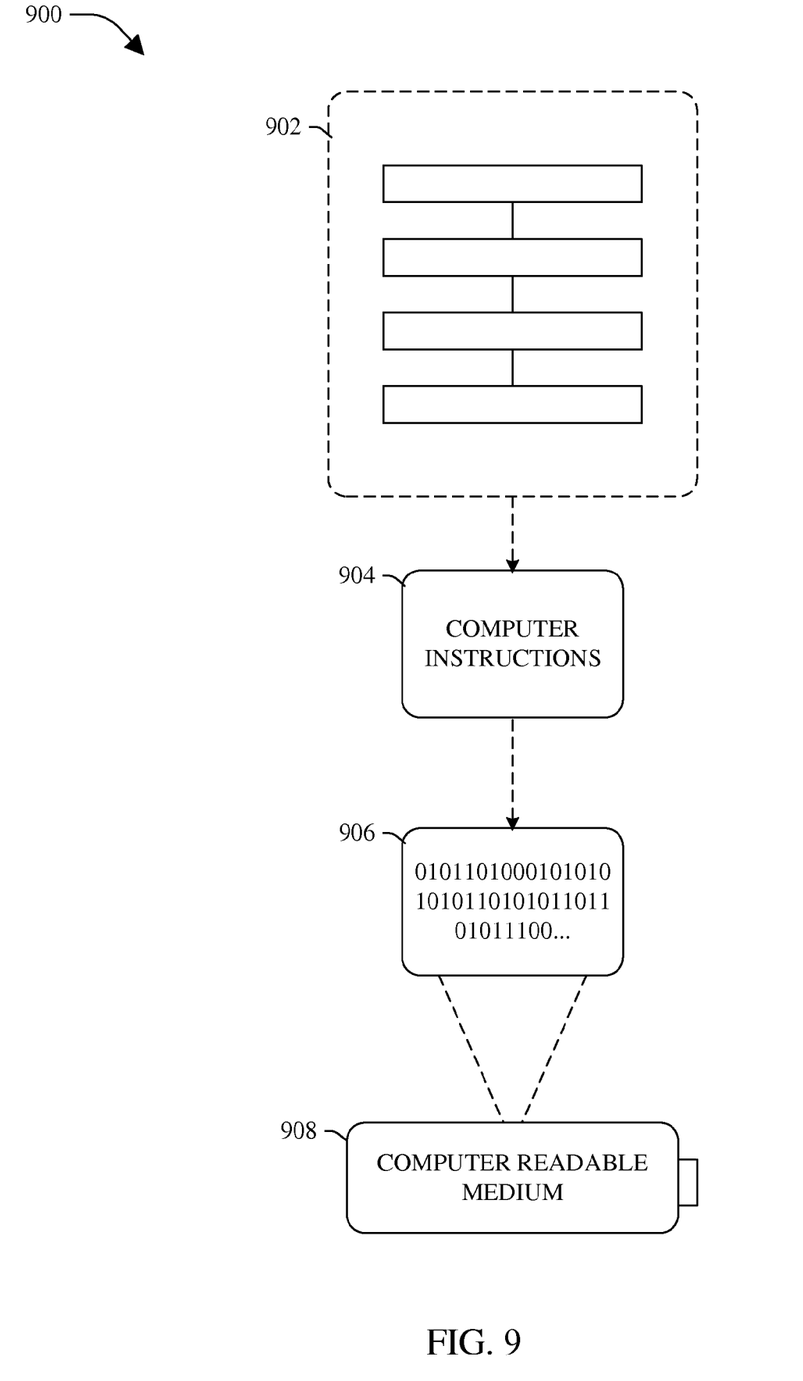
FIG. 9 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This computer-readable data 906, such as binary data including a plurality of zero's and one's as shown in 906, in turn includes a set of computer instructions 904 configured to operate according to one or more of the principles set forth herein. In one such embodiment 900, the processor-executable computer instructions 904 may be configured to perform a method 902, such as the method 800 of FIG. 8. In another embodiment, the processor-executable instructions 904 may be configured to implement a system, such as the system 100 of FIG. 1, FIG. 2, etc. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 10 and the following discussion provide a description of a suitable computing environment to implement embodiments of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 10 illustrates a system 1000 including a computing device 1012 configured to implement one or more embodiments provided herein. In one configuration, computing device 1012 includes at least one processing unit 1016 and memory 1018. Depending on the exact configuration and type of computing device, memory 1018 may be volatile, such as RAM, non-volatile, such as ROM, flash memory, etc., or a combination of the two. This configuration is illustrated in FIG. 10 by dashed line 1014.

In other embodiments, device 1012 includes additional features or functionality. For example, device 1012 may include additional storage such as removable storage or non-removable storage, including, but not limited to, magnetic storage, optical storage, etc. Such additional storage is illustrated in FIG. 10 by storage 1020. In one or more embodiments, computer readable instructions to implement one or more embodiments provided herein are in storage 1020. Storage 1020 may store other computer readable instructions to implement an operating system, an application program, etc. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device may be included with device 1012. Input device(s) 1024 and output device(s) 1022 may be connected to device 1012 via a wired connection, wireless connection, or any combination thereof. In one or more embodiments, an input device or an output device from another computing device may be used as input device(s) 1024 or output device(s) 1022 for computing device 1012. Device 1012 may include communication connection(s) 1026 to facilitate communications with one or more other devices.

As an example, a method for coordinating one or more light components of one or more vehicles may include one or more of the following, according to one or more embodiments. A first vehicle can be engaged in a coordination mode. For example, the first vehicle could be a police car at a traffic stop, and the coordination mode could be associated with a light system where the front lights are on and the rear lights are on. In other words, the coordination mode can be indicative of a police car with a substantial portion of its lights on. A second vehicle can be detected. That is, when the first vehicle is engaged in a traffic stop or parked with a first light system on or engaged, and a second vehicle pulls in to assist the first vehicle, the first vehicle can be configured to detect the second vehicle. The first vehicle can engage in a first modified coordination mode based on detecting the second vehicle. In other words, the first vehicle can turn off rear lights of the first lighting system in response to the second vehicle arriving. In one or more embodiments, the first vehicle can engage in a first modified coordination mode when the second vehicle engages in coordination mode. In other words, the first police car will disable the rear lights on the first police car light bar when the second police car enables the second police car light bar.

In one or more embodiments, one or more commands can be issued or a vehicle can enter a modified coordination mode when it is detected that a vehicle is in park. For example, a second vehicle can enter coordination mode when a first vehicle is detected and the first vehicle is in park and also in coordination mode. In other words, a second police car can automatically deactivate its front light when a first police car is parked and has both front and rear lights engaged. Additionally, modified coordination mode can be entered by a fob component manipulated by an officer.

In other embodiments, coordinating one or more light components of one or more vehicles may be implemented in other ways. For example, a command may be sent to one or more vehicles (e.g., equipped with receivers) to engage in the modified coordination mode. A first vehicle may be detected to be in a coordination mode (e.g., have both front and rear lights active). A command can be transmitted to the first vehicle to engage the first vehicle in a first modified coordination mode. What this means is that the command can turn off the rear lights of the first vehicle. In one or more embodiments, this command can be issued when the first vehicle is detected to be in the coordination mode and stopped, for example. Here, an individual, such as a public safety official, may utilize a device, such as a key-fob, to have the light system of the first vehicle turn the rear lights off. In other embodiments, this may occur automatically when the second officer engages his or her light system and is in proximity of the scene. The second vehicle can engage in a second modified coordination mode. As an example, the light system of the second vehicle can be configured to have the rear lights on, and the front lights off. In this way, the police officer from the first vehicle may not have his or her vision impaired from the light system of the second vehicle.

Embodiments of managing, coordinating, or controlling one or more lighting systems on one or more vehicles are disclosed. As an example, when a first vehicle outfitted with a first vehicle lighting system, such as a first police car pulls a suspect vehicle over, the first vehicle lighting system may be in a coordination mode where a front portion and a rear portion are both on. When a second vehicle outfitted with a second vehicle lighting system, such as a second police car, arrives, the rear portion of the first vehicle lighting system can be disabled, dimmed, or modified such that light from the first vehicle lighting system is mitigated from impeding a view of the second officer.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for operating light systems, comprising:
   a plurality of communication devices that detects and communicates with at least one light device;
   a manual control device that controls the operation of the at least one light device based on the communication of the plurality of communication devices with the at least one light device; and
   a mode component in communication with the plurality of communication devices that changes an operating mode of the system based on information from the plurality of communication devices,
   wherein the plurality of communication devices includes a plurality of sensors, a plurality of transmitters, and a plurality of receivers, and
   wherein the operating mode includes a normal mode wherein the sensors are actively sensing at least one vehicle and the plurality of transmitters and the plurality of receivers are not transmitting and receiving signals respectively.

2. The light coordination system of claim 1, wherein the operating mode includes a coordination mode wherein the sensors are actively sensing the at least one vehicle and the plurality of transmitters and the plurality of receivers are transmitting and receiving signals to and from the at least one light device respectively.

3. The system of claim 1, further comprising a light coordination scheme generated from information from the plurality of communication devices and the mode component.

4. The system of claim 3, further comprising an activation/deactivation device that automatically activates/deactivates the at least one light device based on the light coordination scheme.

5. The light coordination system of claim 1, wherein the manual control device is an electronic remote device.

6. The light coordination system of claim 5, wherein the electronic remote device is a key fob.

7. A system for operating light systems, comprising:
   a plurality of communication devices that detects and communicates with at least one light device;
   a manual control device that controls the operation of the at least one light device based on the communication of the plurality of communication devices with the at least one light device; and
   a mode component in communication with the plurality of communication devices that changes an operating mode of the system based on information from the plurality of communication devices,
   wherein the plurality of communication devices includes a plurality of sensors, a plurality of transmitters, and a plurality of receivers, and
   wherein the operating mode includes a coordination mode wherein the sensors are actively sensing at least one vehicle and the plurality of transmitters and the plurality of receivers are transmitting and receiving signals to and from the at least one light device respectively.

8. The system of claim 7, wherein the operating mode includes a normal mode wherein the sensors are actively sensing the at least one vehicle and the plurality of transmitters and the plurality of receivers are not transmitting and receiving signals respectively.

9. The system of claim 7, further comprising a light coordination scheme generated from information from the plurality of communication devices and the mode component.

10. The system of claim 9, further comprising an activation/deactivation device that automatically activates/deactivates the at least one light device based on the light coordination scheme.

11. The light coordination system of claim 7, wherein the manual control device is an electronic remote device.

12. The light coordination system of claim 11, wherein the electronic remote device is a key fob.

* * * * *